(12) United States Patent
Hoshina

(10) Patent No.: US 7,086,588 B2
(45) Date of Patent: Aug. 8, 2006

(54) DATA COMMUNICATION SYSTEMS, IDENTIFICATION TAGS AND METHODS OF NOTIFYING AN ELAPSED TIME PERIOD

(75) Inventor: Masaki Hoshina, Suwa (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 10/996,820

(22) Filed: Nov. 23, 2004

(65) Prior Publication Data
US 2005/0127174 A1 Jun. 16, 2005

(30) Foreign Application Priority Data
Nov. 28, 2003 (JP) ............................. 2003-399345

(51) Int. Cl.
*G06K 5/00* (2006.01)
*G06K 19/06* (2006.01)
(52) U.S. Cl. ..................... 235/380; 235/492; 235/487
(58) Field of Classification Search ................ 235/487, 235/492, 380; 340/572.1–572.9; 349/86
See application file for complete search history.

(56) References Cited

U.S. PATENT DOCUMENTS

| | | | | |
|---|---|---|---|---|
| 5,055,662 A | * | 10/1991 | Hasegawa | .................. 235/492 |
| 5,802,015 A | * | 9/1998 | Rothschild et al. | ........... 368/10 |
| 6,118,426 A | * | 9/2000 | Albert et al. | ................ 345/107 |
| 6,753,830 B1 | * | 6/2004 | Gelbman | ..................... 345/55 |
| 6,853,412 B1 | * | 2/2005 | Stephenson | .................. 349/86 |
| 2004/0222889 A1 | | 11/2004 | Hoshina et al. | |

FOREIGN PATENT DOCUMENTS

| | | |
|---|---|---|
| JP | 10-305680 | 11/1998 |
| JP | 2004-280434 | 10/2004 |

* cited by examiner

Primary Examiner—Thien M. Le
Assistant Examiner—Jamara A. Franklin
(74) Attorney, Agent, or Firm—Harness, Dickey & Pierce, P.L.C.

(57) ABSTRACT

A data communication system is provided comprising: a reader/writer device; and an identification tag that is capable of data communications with the reader/writer device, wherein: the reader/writer device has a first data communication section that is capable of data communications with the identification tag; the identification tag has a second data communication section that is capable of data communications with the reader/writer device, and a display section that is capable of displaying based on data received by the second data communication section, and the display section is capable of retaining a display content for a predetermined period of time in a state in which no drive voltage is applied; and a display retaining period of the display section is variable.

14 Claims, 13 Drawing Sheets

DATA COMMUNICATION SYSTEMS, IDENTIFICATION TAGS AND METHODS OF NOTIFYING AN ELAPSED TIME PERIOD

RELATED APPLICATIONS

This application claims priority to Japanese Patent Application No. 2003-399345 filed Nov. 28, 2003 which is hereby expressly incorporated by reference herein in its entirety.

BACKGROUND

1. Technical Field

The present invention relates to data communication systems, identification tags and methods of notifying an elapsed time period

2. Related Art

Conventionally, "best-before" dates of food and drinks, "expiration dates" of commuter passes, and "return time" limits of rental articles, etc. are printed on articles and/or their containers, or lending forms affixed to articles, in the form of characters showing dates that indicate time limits. The time limits can be learned by reading them.

However, according to such a display method, in order to know if the time limit has passed, or the time limit approaches, the date displayed needs to be recognized as characters and compared with a present date to make a judgment. For this reason, it was difficult to make such a judgment instantaneously.

In this regard, a method has been proposed in which a commuter pass is equipped with a display device, and the display device is made to display an alert message when its expiration is approaching (for example, Japanese Laid-open Patent Application HEI 10-305680).

However, according to the method indicated in Japanese Laid-open Patent Application HEI 10-305680, an alert is notified through an automatic ticket machine by passing the above-described commuter pass through the automatic ticket machine, and therefore this method is not applicable when a ticket gate without an automatic ticket machine is used, and is difficult to be applied to other usages, such as notifications of best-before dates of food and drinks, return time limits of rental articles, etc.

The present invention has been made in view of the problems described above, and an object is to provide data communication systems, identification tags, and elapsed time notification methods, which enable visual and instantaneous recognitions of best-before dates, expiration dates, etc. in various usages.

SUMMARY

A data communication system in accordance with the present invention includes a reader/writer device and an identification tag that is capable of data communications with the reader/writer device, wherein: the reader/writer device has a first data communication section that is capable of data communications with the identification tag, and the identification tag has a second data communication section that is capable of data communications with the reader/writer device, and a display section that is capable of displaying based on data received by the second data communication section, and is capable of retaining a display content for a predetermined period of time in a state in which a drive voltage is not applied, wherein a display retaining period of the display section is variable.

According to the above, the identification tag has a display section that is capable of retaining a display content for a predetermined period of time in a state in which a drive voltage is not applied, and the display retaining period can be varied, such that a display content at the display section can be retained for a desired period of time. Here, because the display condition at the display section changes, for example, the display disappears, after the above-described display retaining period has elapsed, the passage of time elapsed from the time of a drive voltage application can be learned by the display state of the display section. Therefore, by setting display retaining periods to match with expiration dates, etc. of commercial products, these time limits can be visually and instantaneously recognized.

In the data communication system, the identification tag may have a control section that controls the second data communication section and the display section.

According to the above, because the identification tag has the control section, a part of the step of setting the display retaining period can be executed instead by the identification tag, the reader/writer device may only have to transmit data corresponding to a desired display retaining period.

In the data communication system, the control section of the identification tag may have an application time variable section that is capable of changing the time duration to apply a drive voltage to the display section based on data received from the reader/writer device by the second data communication section.

According to the above, because the identification tag has the application time variable section that is capable of changing the time duration of application of a drive voltage to the display section, the reader/writer device may only have to transmit data corresponding to a desired display retaining period, and the identification tag can control the time duration of application of the drive voltage to the display section, and can set a desired display retaining period. In other words, the reader/writer device does not need to control the time duration to apply a drive voltage to the display section.

In the data communication system, the control section of the identification tag may have an application voltage variable section that is capable of changing the drive voltage to be applied to the display section based on data received from the reader/writer device by the second data communication section.

According to the above, because the identification tag has the application voltage variable section that is capable of changing the drive voltage to be applied to the display section, the reader/writer device may only have to transmit data corresponding to a desired display retaining period, and the identification tag can control the drive voltage to be applied to the display section, and can set a desired display retaining period. In other words, the reader/writer device does not need to change the drive voltage to be supplied to the identification tag according to display retaining periods that are set. Furthermore, the display retaining period is set by controlling the drive voltage to be applied to the display section, such that, even when different display retaining periods are set for a plurality of identification tags, the drive voltage application time does not need to be controlled according to the display retaining periods.

A data communication system in accordance with the present invention includes a reader/writer device and a plurality of identification tags that are capable of data communications with the reader/writer device, wherein: the reader/writer device has a first data communication section that is capable of data communications with the identification tags, and each of the identification tags has a second data communication section that is capable of data communications with the reader/writer device, and a display section that is capable of displaying based on data received by the second data communication section, and is capable of retaining a display content for a predetermined period of time in a state in which a drive voltage is not applied, wherein the plurality of identification tags comprise identification tags with at least two kinds of display retaining periods when a drive voltage is applied to the display section under identical conditions.

According to the above, because there are identification tags with at least two kinds of display retaining periods included; expiration dates in a number corresponding to the number of the kinds can be set even when an identical drive voltage is applied for the same period of time to the display sections of all the identification tags.

In the data communication system, the first data communication section and the second data communication section may be capable of data communications in a contactless manner, the reader/writer device may have an electromagnetic wave transmission section for electric power supply that transmits electromagnetic waves for electric power supply to the identification tags at the time of data communications by the first data communication section, and the identification tag may have an electric power generation section that generates electric power from the electromagnetic waves for electric power supply transmitted from the reader/writer device.

According to the above, because data communications are possible in a contactless manner, the identification tag does not have to be connected to the reader/writer device at the time of data communications, and display retaining periods of numerous identification tags can be readily set. Moreover, the identification tag generates electric power from electromagnetic waves transmitted from the reader/writer device, such that the identification tag does not have to be equipped with a power supply source, and thus the identification tag can be made smaller and thinner.

In the data communication system, the reader/writer device may have an application time variable section that is capable of changing the time duration to apply the drive voltage to the display section.

According to the above, because the reader/writer device is equipped with the application time variable section for changing the display retaining period of the display section, the circuit structure of the identification tag can be simplified, and the identification tag can be made smaller in size, and the cost thereof can be lowered. Further, in this case, if the reader/writer device and the identification tag are constructed such that data communications are conducted in a contact manner, the identification tag can be composed only with a display section that is equipped with a terminal as the second data communication section.

In the data communication system, the reader/writer device may have an application voltage variable section that is capable of changing the drive voltage to be applied to the display section.

According to the above, because the reader/writer device is equipped with the application voltage variable section for changing the display retaining period of the display section, the circuit structure of the identification tag can be simplified, and the identification tag can be made smaller in size, and the cost thereof can be lowered. Further, in this case, if the reader/writer device and the identification tag are constructed such that data communications are conducted in a contact manner, the identification tag can be composed only with a display section that is equipped with a terminal as the second data communication section.

An identification tag in accordance with the present invention comprises: a second data communication section that is capable of data communications with a reader/writer device, a display section that is capable of displaying based on data received by the second data communication section, and is capable of retaining a display content for a predetermined period of time in a state in which a drive voltage is not applied, and a control section that controls the second data communication section and the display section, wherein the control section is capable of varying a display retaining period of the display section.

According to the above, the identification tag has a display section that is capable of retaining a display content for a predetermined period of time even in a state in which a drive voltage is not applied, and the display retaining period can be varied, such that a display content at the display section can be retained for a desired period of time. Here, because the display condition at the display section changes, for example, the display disappears, after the above-described display retaining period has elapsed, the passage of time elapsed from the time when a drive voltage was applied can be learned by the display state of the display section. Therefore, by setting display retaining periods to match with expiration dates, etc. of commercial products, these time limits can be visually and instantaneously recognized.

In the identification tag, the control section may have an application time variable section that is capable of changing the time duration to apply the drive voltage to the display section based on data received from the reader/writer device by the second data communication section.

According to the above, because the identification tag has the application time variable section that is capable of changing the time duration to apply a drive voltage to the display section, the reader/writer device may only have to transmit data corresponding to a desired display retaining period, and the identification tag can control the time duration to apply a drive voltage to the display section, and can set a desired display retaining period. In other words, the reader/writer device does not need to control the time duration to apply a drive voltage to the display section.

In the identification tag, the control section may have an application voltage variable section that is capable of changing the drive voltage to be applied to the display section based on data received from the reader/writer device by the second data communication section.

According to the above, because the identification tag has the application voltage variable section that is capable of changing the drive voltage to be applied to the display section, the reader/writer device may only have to transmit data corresponding to a desired display retaining period, and the identification tag can control the drive voltage to be applied to the display section, and can set a desired display retaining period. In other words, the reader/writer device does not need to change the drive voltage to be supplied to the identification tag according to display retaining periods that are set. Furthermore, the display retaining period is set by controlling the drive voltage to be applied to the display section, such that, even when different display retaining periods are set for a plurality of identification tags, the drive voltage application time does not need to be controlled according to the display retaining periods.

In the identification tag, the second data communication section may be capable of data communications in a contactless manner with the reader/writer device, and may have an electric power generation section that generates electric power from electromagnetic waves for electric power supply received from the reader/writer device.

According to the above, because data communications can be made in a contactless manner, the identification tag does not have to be connected to the reader/writer device at the time of data communications, and display retaining periods of numerous identification tags can be readily set. Moreover, the identification tag generates electric power from electromagnetic waves transmitted from the reader/writer device, such that the identification tag does not have to be equipped with a power supply source, and thus the identification tag can be made smaller and thinner.

A method for notifying an elapsed time period in accordance with the present invention comprises: notifying an elapsed time period based on a change in a display state of a display device that is capable of retaining a display for a predetermined period of time in a state in which a drive voltage is not applied.

According to the above, in the display device that is capable of retaining a display content for a predetermined period of time even in a state in which a drive voltage is not applied, the display condition at the display section changes, for example, the display disappears, after the above-described display retaining period has elapsed, and therefore the passage of time elapsed from the time when a drive voltage was applied can be learned by the display state of the display section. As a result, by setting display retaining periods to match with expiration dates, etc. of commercial products, these time limits can be visually and instantaneously recognized.

A method for notifying an elapsed time period in accordance with the present invention comprises: attaching to an item an identification tag with a display section that is capable of retaining a display for a predetermined period of time in a state in which a drive voltage is not applied, and notifying an expiration time of the item according to a change in a display state of the display section.

According to the above, with the display device that is capable of retaining a display content for a predetermined period of time even in a state in which a drive voltage is not applied, the display condition at the display section changes, for example, the display disappears, after the above-described display retaining period has elapsed, and therefore the passage of time elapsed from the time when a drive voltage was applied can be learned by the display state of the display section. As a result, by setting display retaining periods to match with expiration dates, etc. of commercial products, these time limits can be visually and instantaneously recognized.

BRIEF DESCRIPTION OF THE DRAWINGS

FIGS. 6(a)–(c) schematically show the principle of operations of the electrophoretic display device, wherein FIG. 6(a) shows a state in which a drive voltage is not applied, FIG. 6(b) shows a state in which a drive voltage is applied, and FIG. 6(c) shows a state in which a drive voltage in the reverse direction of the drive voltage applied in FIG. 6(b) is applied.

DETAILED DESCRIPTION

Embodiments of the present invention are described below with reference to the accompanying drawings. It is noted that the embodiments described below do not limit the scope of the invention recited in the claims. Also, all of the compositions to be described below are not necessarily essential to the invention recited in the claims.

First Embodiment

Figure 1:
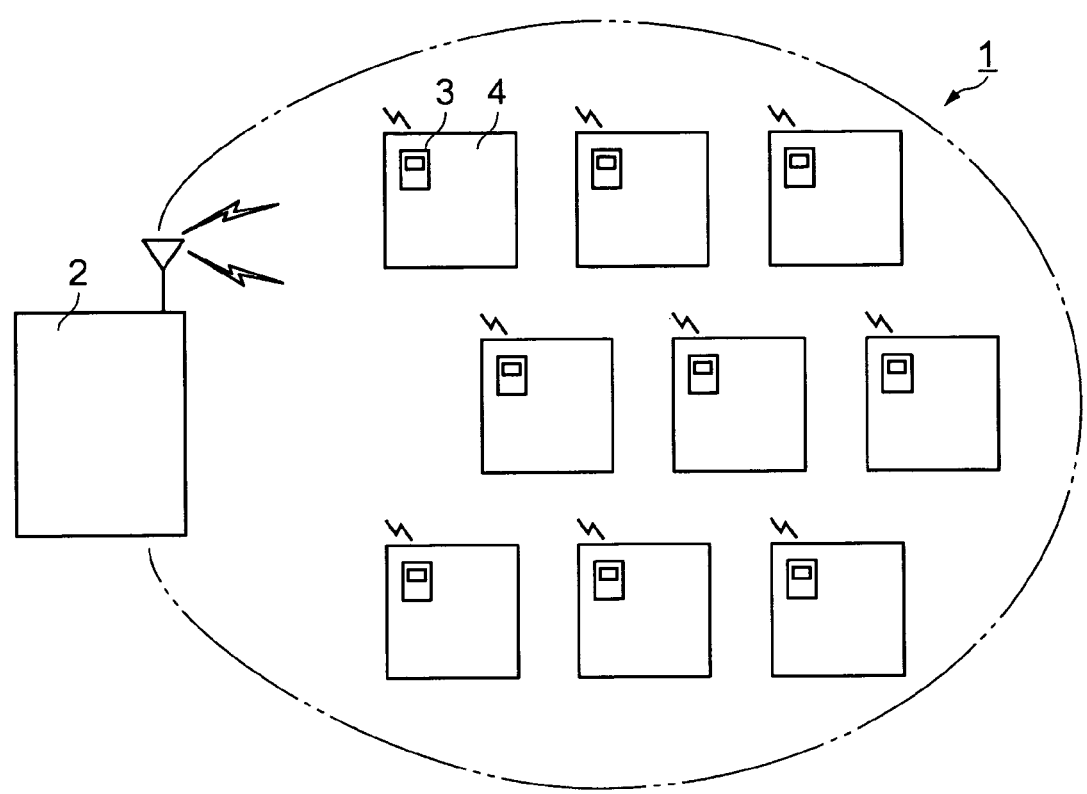
FIG. 1 is a schematic structural diagram showing a structure of a data communication system in accordance with a first embodiment.

A data communication system in accordance with a first embodiment of the present invention is described with reference to FIG. 1. FIG. 1 is a schematic structural diagram showing a structure of the data communication system.

As shown in FIG. 1, the data communication system 1 has a structure including a reader/writer device 2, and a plurality of identification tags 3. In the present embodiment, the identification tags 3 are attached to commodities 4. Here, the commodities 4 are food products that have best-before dates.

The reader/writer device 2 performs data communications in a contactless manner, such as, writing management data such as product names, unit prices, best-before dates, and the like in the identification tags 3 attached to the commodities 4, and reading the management data written in the identification tags 3.

The identification tags 3 may be attached to packages of the respective commodities, and correlated in one-to-one relation with the commodities 4. Also, identification tags 3 perform data communications in a contactless manner using ID numbers with the reader/writer device 2, and manages the commodities 4. It is noted that the ID numbers are unique to the respective identification tags 3, and are stored in data storage sections (see FIG. 3) of the respective identification tags 3.

After the reader/writer device 2 writes management data in the identification tags 3, the respective commodities 4 are exhibited in the shop.

Figure 2:
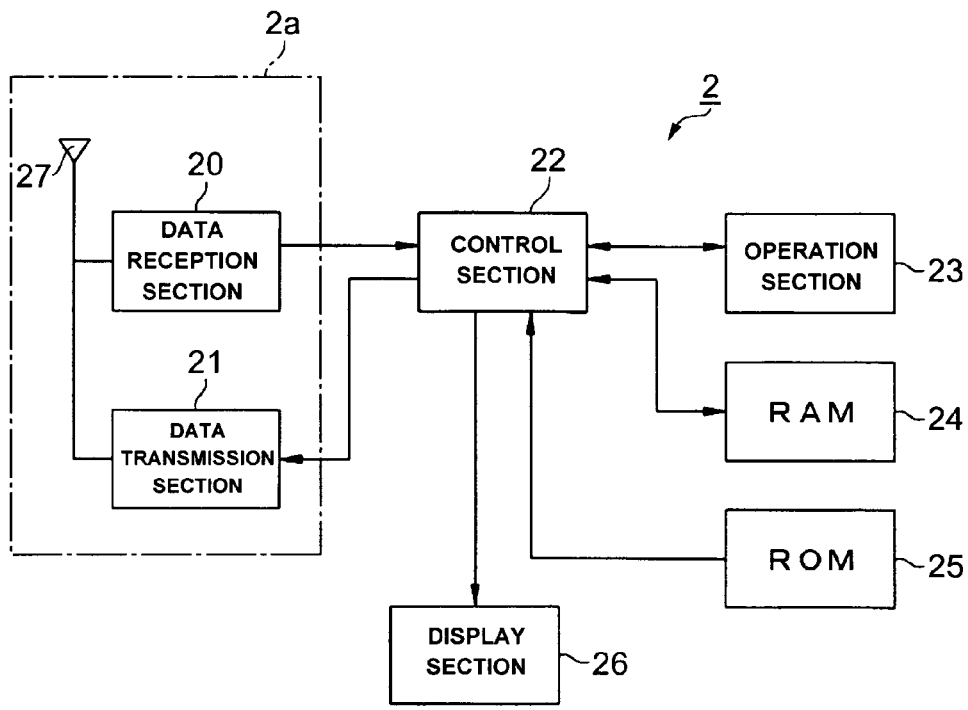
FIG. 2 is a block diagram schematically showing a structure of a reader/writer device.

Next, a structure of the reader/writer device 2 is described with reference to FIG. 2. FIG. 2 is a block diagram showing a schematic structure of the reader/writer device 2.

As shown in FIG. 2, the reader/writer device 2 has a structure including a data reception section 20, a data transmission section 21, a control section 22, an operation section 23, a RAM (Random Access Memory) 24, a ROM (Read Only Memory) 25, a display section 26, and an antenna 27. Here, the data reception section 20, the data transmission section 21 and the antenna 27 compose a data communication section 2a as a first data communication section, and the data communication section 2a performs data communications with the identification tags 3.

The data reception section 20 receives data from the identification tags 3 in a contactless manner, and can acquire management data, etc. stored in the identification tag 3s through the antenna 27.

The data transmission section 21 transmits data, commands, and the like, such as, management data and the like to be written in the identification tags 3 in a contactless manner through the antenna 27.

Here, data communications between the reader/writer device 2 and the identification tags 3 in the present embodiment are conducted by using an electromagnetic induction method in which communications are conducted by using electromagnetic waves of long to medium frequency bands, mainly, a 250 kHz band or less, or a 13.56 MHz band, and a selective access mode is used whereby communications can be made with specific identification tags 3 among the plurality of identification tags 3 within the range of communication. Moreover, in the present embodiment, since carrier waves (electromagnetic waves) used when transmitting data and commands are used for supplying electrical power to the identification tags 3, the data transmission section 21 and the antenna 27 also function as an electromagnetic wave transmission section for power supply that transmits electromagnetic waves for power supply to the identification tags 3.

The kinds of commands to the identification tags 3 include a response request command, a memory write command, a memory read command, a display command, and the like. When the reader/writer device 2 transmits a response request command, ID numbers of all of the identification tags 3 that received the command are transmitted to the reader/writer device 2. The memory write command and the memory read command are commands that specify ID numbers, write data in the data storage sections 33 of the specified identification tags 3, and read data stored in the data storage sections 33. The display command specifies ID numbers, and performs a prescribed display on electrophoretic display devices 34 (see FIG. 3) of the specified identification tags.

The control section 22 executes control programs stored in the ROM 25 by a CPU (Central Processing Unit) (not shown), whereby the operation of the reader/writer device 2 is generally controlled. The contents of the control include, first, data communication processings by an electromagnetic induction method using the data reception section 20 and the data transmission section 21, such as, receiving data from the identification tags 3, and transmitting data to the identification tags 3. Further, the control of processing to change set values that are used at the time of executing the control programs, etc. according to operation contents at the operation section 23, and the control of display processing that displays information, etc. acquired from the identification tags 3 in display panel 26 are also included.

The operation section 23 is equipped with operation switches for turning on and off the power supply, resetting programs, etc., and sections for setting data contents to be written in the identification tags 3.

The RAM 24 is a memory that temporarily stores necessary data when the control program stored in the ROM 25 is executed with the CPU of the control section 22, and the ROM 25 is a read only memory that stores control program for generally controlling the reader/writer device 2.

The display section 26 is equipped with a display area, such as, a liquid crystal display, and is equipped with a function to display information obtained from the identification tags 3, contents of the current setting of the reader/writer device 2, the execution status of processings, and the like.

Figure 3:
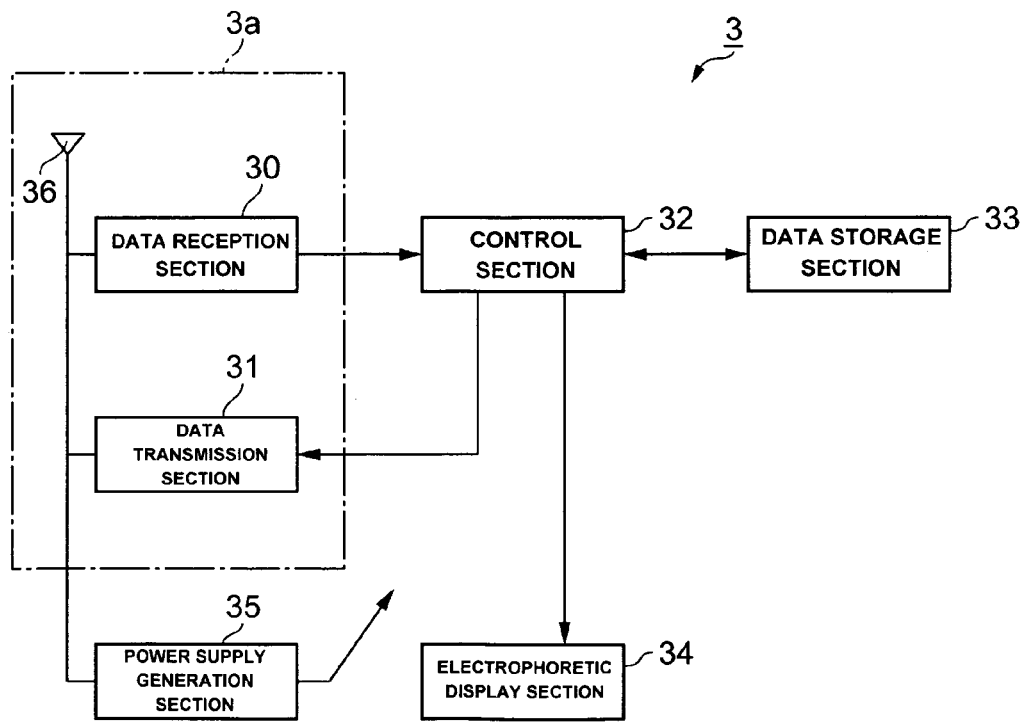
FIG. 3 is a block diagram schematically showing a structure of an identification tag.

Next, a structure of the identification tag 3 is described with reference to FIG. 3. FIG. 3 is a block diagram schematically showing the structure of the identification tag 3.

As shown in FIG. 3, the identification tag 2 has a structure including a data reception section 30, a data transmission section 31, a control section 32, a data storage section 33, an electrophoretic display device 34 as a display section and a display device, a power supply generation section 35 as an electric power generation section, and a coil antenna 36. Here, the data reception section 30, the data transmission section 31, and the coil antenna 36 compose a data communication section 3a as a second data communication section, and data communications with the reader/writer device 2 are performed through the data communication section 3a.

The data reception section 30 is equipped with a function to receive data transmitted from the reader/writer device 2 by an electromagnetic induction method. Also, the data transmission section 31 is equipped with a function to transmit data stored in the data storage section 33 to the reader/writer device 2 by an electromagnetic induction method. These reception and transmission are performed through the coil antennal 36.

The control section 32 controls operations of the respective sections of the identification tag 3 by a logic circuit, and controls the transmission and reception of data at the data communication section 3a, the processing to store data received, and controls to display specified information on the electrophoretic display device 34. In the present embodiment, the structure provided controls operations of the identification tags 3 by the logic circuit. However, without being limited to this embodiment, these operations may be controlled through executing a control program by the CPU.

The data storage section 33 includes a nonvolatile memory, such as, a flash memory, a ferroelectric memory (FeRAM), etc., and stores data, such as, management data, etc. received from the reader/writer device 2 according to instructions given by the control section 32.

The electrophoretic display device 34 is a display device using an electrophoretic phenomenon, and displays data, etc. received from the reader/writer device 2. Since the electrophoretic display device 34 has the capacity to retain a displayed image (memory capacity), once an image is displayed by applying a drive voltage, the image can be retained for a while even after the application of the drive voltage is removed. Here, the electrophoretic phenomenon refers to a phenomenon in which, when an electric field is impressed to a dispersion liquid in which charged micro particles (electrophoretic particles) are dispersed in a liquid phase dispersion medium, the micro particles electrophoretically migrate according to Coulomb's force.

The power supply generation section 35 generates electric power from carrier waves (electromagnetic waves) used when transmitting data and commands by the reader/writer device 3, and supplies the same to the respective sections described above.

Figure 4:
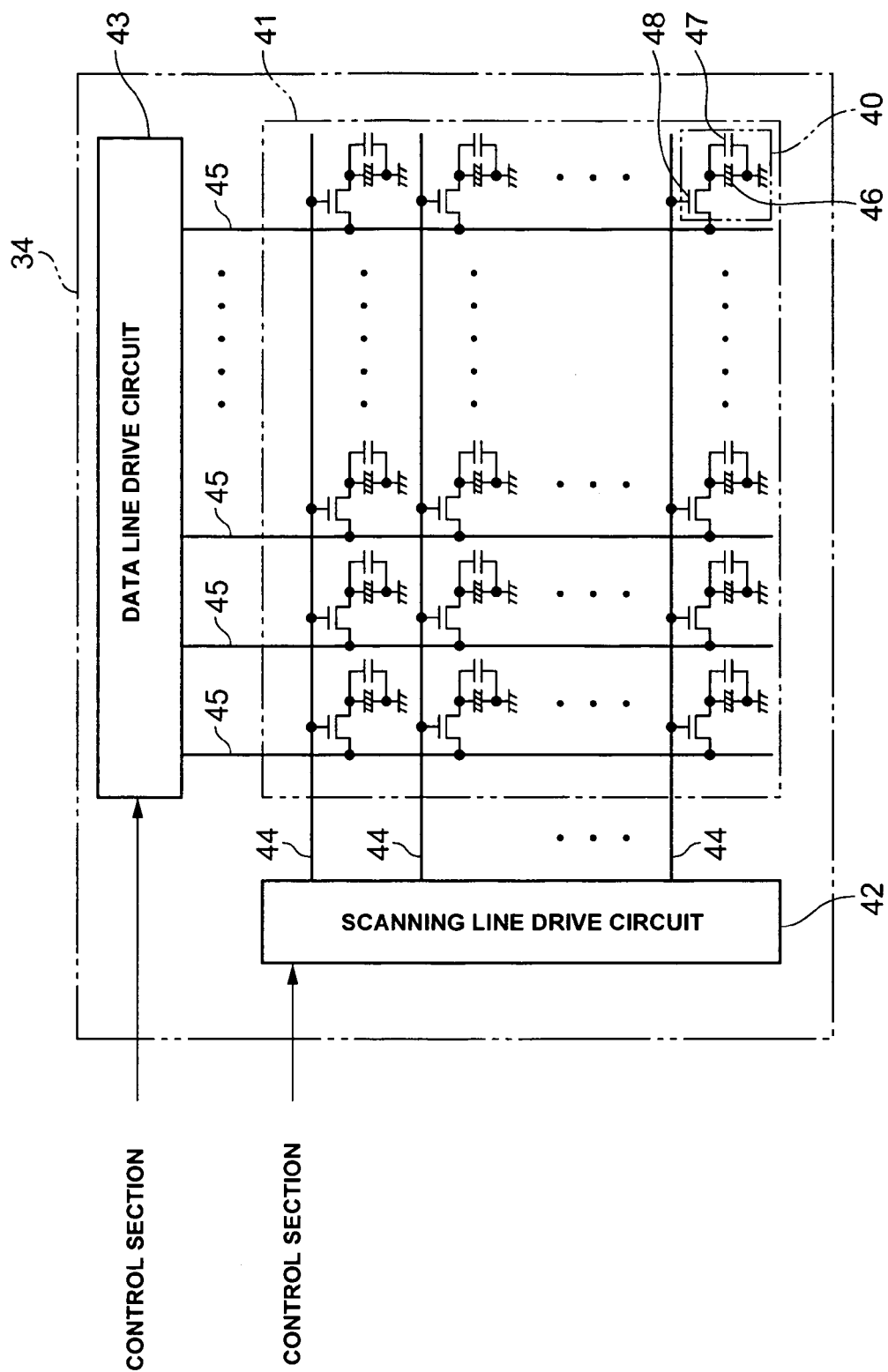
FIG. 4 is a block diagram showing a circuit structure of an electrophoretic display device.
Figure 5:
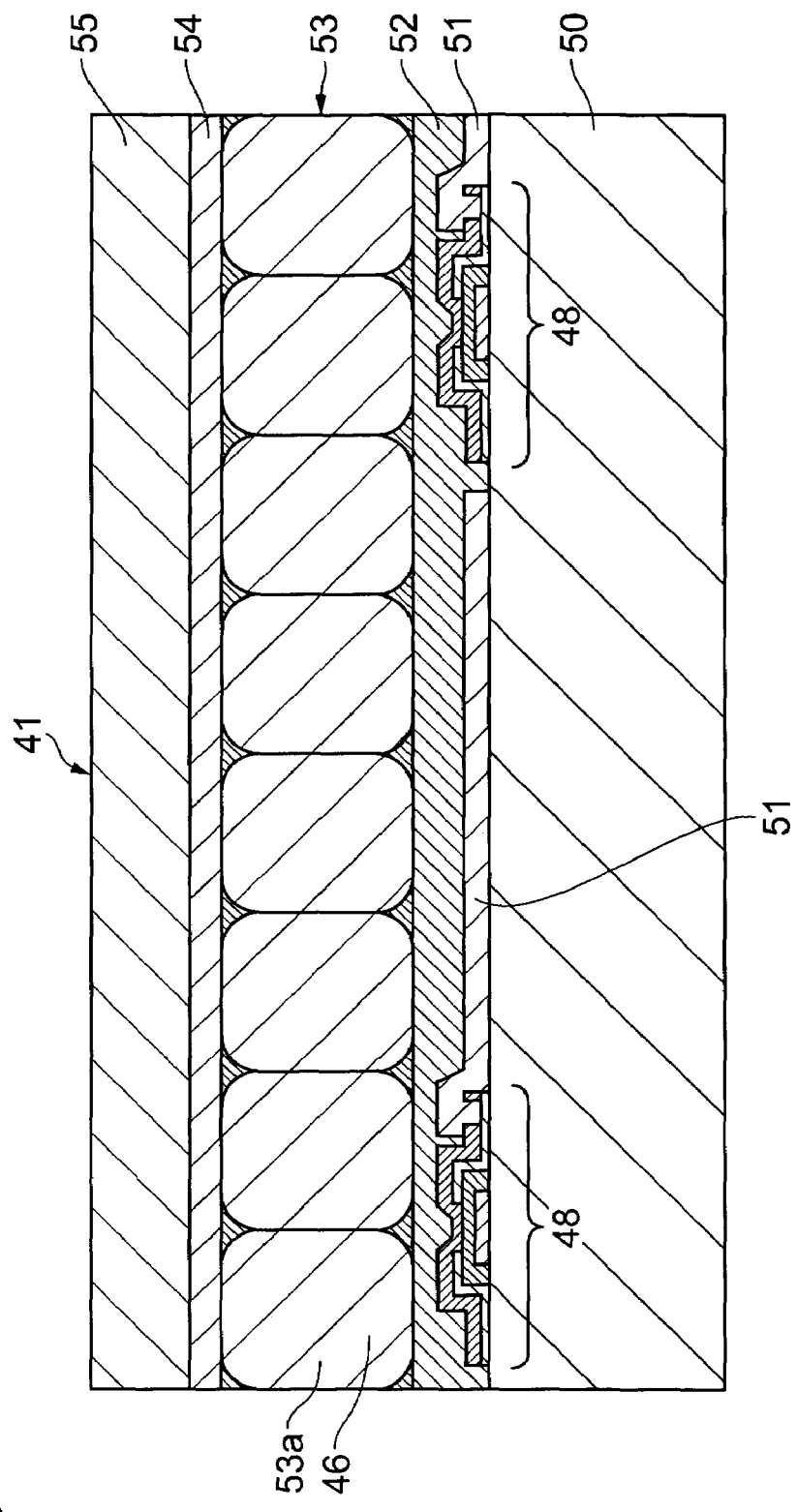
FIG. 5 is an enlarged cross-sectional view of a cross section of a display region for one pixel of the electrophoretic display device.

Next, the structure of the electrophoretic display device 34 of the identification tag 3 is described with reference to FIG. 4 and FIG. 5. FIG. 4 is a block diagram showing a circuit structure of the electrophoretic display device 34, and FIG. 5 is an enlarged cross-sectional view showing a cross section of a display area for one pixel.

As shown in FIG. 4, the electrophoretic display device 34 has a display area 41 where a plurality of pixels 40 are arranged in a matrix, and is equipped on its circumferential area with a scanning line drive circuit 42 and a data line drive circuit 43, which consist of TFTs (Thin Film Transistors), etc. The scanning line drive circuit 42 supplies scanning signals for selecting pixels 40 through a plurality of scanning lines 44. The data line drive circuit 43 supplies data signals corresponding to an image to be displayed through a plurality of data lines 45 to each of the pixels 40.

Further, each of the pixels 40 includes an electrophoretic dispersion liquid 46, a capacitor element 47 to maintain the state of electric polarization, and a transistor 48 for accumulating a charge in the capacitor element 47 by switching operations. The electrophoretic dispersion liquid 46 is expressed equivalently as a capacitor element in the figure. A scanning line 44 is connected to a gate of the transistor 48, and a data line 45 is connected to a source of the transistor 48. Moreover, the electrophoretic dispersion liquid 46 and the capacitor element 47 are connected in parallel between a drain of the transistor 48 and the grounding potential.

It is noted that the transistor 48 may be manufactured by using a liquid phase process, but there are cases where an ink jet method is preferably used.

As the electrophoretic display device 34 is structured in a manner described above, the control section 32 controls the data line drive circuit 43, whereby data signals corresponding to display data are outputted to each of the data lines 45. Further, the control unit 32 controls the scanning line drive circuit 42, whereby a scanning signal is outputted to one of the scanning lines 44. As a result, among the transistors 48 in the display area 41, those of the transistors in which the scanning signal is applied to their gates turn on, and charges accumulate in their capacitor elements 47 by data signals provided through the data lines 45, and the electrophoretic dispersion liquid 46 is placed in an electric polarization state. Even when the transistors are turned off later, the electric polarization state of the electrophoretic dispersion liquid 46 is maintained for a prescribed period of time by the charges accumulated in the capacitor elements 47. A display according to the display data can be made on the entire display area 41 by repeating the above on all of the scanning lines 44.

The display area 41 of the electrophoretic display device 34 is formed on a substrate 50 formed of glass, PET (Polyethylene Terephthalate), or the like, as shown in FIG. 5. The transistors 48 and electrodes 51 that are connected with the drains of the transistors 48, and consist of ITO (Indium Tin Oxide), are formed on the substrate 50. Upper surfaces thereof are covered by a resin layer 52. An electrophoretic dispersion layer 53 is formed on the resin layer 52, and numerous microcapsules 53*a* in which the electrophoretic dispersion liquid 46 is enclosed are arranged in the electrophoretic dispersion layer 53. The electrophoretic dispersion liquid 46 in the microcapsules 53*a* has liquid phase dispersion medium described above and the electrophoretic particles dispersed in the liquid phase dispersion medium. A transparent electrode 54 formed of ITO is formed on the electrophoretic dispersion layer 53, and an upper surface thereof is protected by a PET film 55. Moreover, although not shown in FIG. 5, the capacitor element 47 is connected between the electrode 51 and the transparent electrode 54, and the transparent electrode 54 is grounded. It is noted that, because the resin layer 52 can be made to function as a dielectric body of the capacitor element by properly selecting the material of the resin layer 52, the capacitor element 47 is not necessarily needed.

Figure 6:
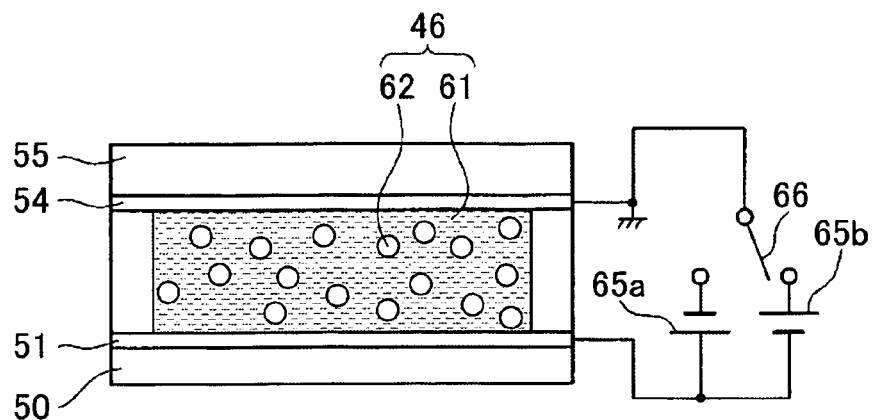
Figure 6:
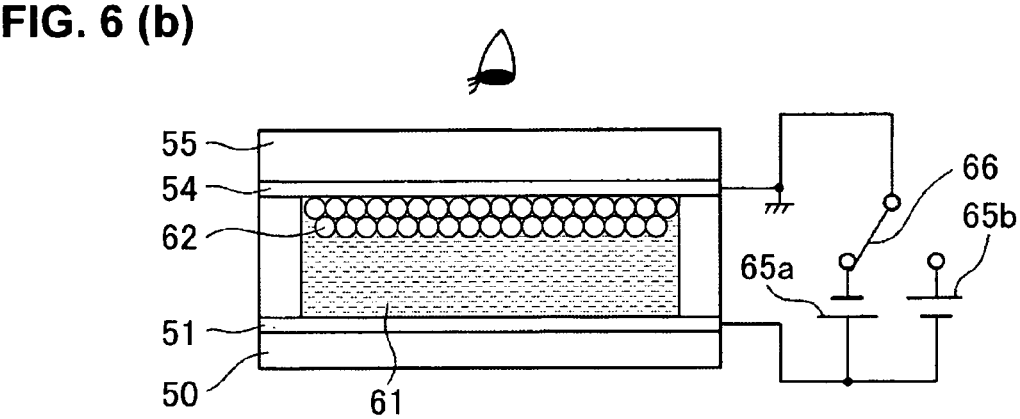
Figure 6:
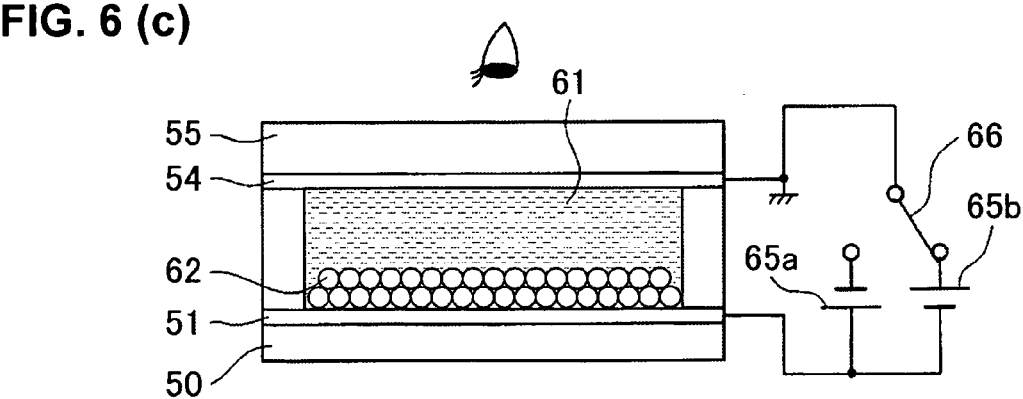

Next, the principle of operations of the electrophoretic display device 34 is described with reference to FIGS. 6(*a*)–(*c*). FIGS. 6(*a*)–(*c*) schematically show the principle of operations of the electrophoretic display device 34, wherein FIG. 6(*a*) shows a state in which a drive voltage is not applied to the electrophoretic display device 34, FIG. 6(*b*) shows a state in which a drive voltage is applied, and FIG. 6(*c*) shows a state in which a drive voltage in the reverse direction of the drive voltage applied in FIG. 6(*b*) is applied. It is noted that these figures show only the states of one microcapsule 53*a* for the sake of simplicity.

As shown in FIG. 6(*a*), the electrophoretic dispersion liquid 46 in the microcapsule 53*a* exists between the electrode 51 and the transparent electrode 54. The electrophoretic dispersion liquid 46 is composed of the liquid phase dispersion 61 and the electrophoretic particles 62 dispersed in the liquid phase dispersion medium 61. Here, the liquid phase dispersion medium 61 and the electrophoretic particles 62 are colored in mutually different colors. In the present embodiment, the liquid phase dispersion medium 61 has a deeper color, and the electrophoretic particles 62 are lighter color. Moreover, the electrophoretic particles 62 are assumed to be positively charged.

The electrode 51 is connected with two voltage sources 65*a* and 65*b* to apply drive voltages in mutually reverse directions. On the other hand, the transparent electrode 54 grounded can be electrically connected with one of the two voltage sources 65*a* and 65*b* by a switching circuit 66, such that, in response to them, a positive or a negative drive voltage is applied to the electrode 51. Accordingly, the direction of the drive voltage applied to the electrophoretic dispersion liquid 46 can be changed by the switching of the switching circuit 66, and therefore the state of electric polarization of the electrophoretic dispersion liquid 46 can be switched by changing the direction of the drive voltage to be applied. More specifically, as shown in FIG. 6(*b*), when the voltage source 65*a* is connected, a positive drive voltage is applied to the electrode 51, and the electrophoretic particles 62 that are positively charged migrate to the transparent electrode 54 side near the observer. In this state, the observer sees the color (light color) of the electrophoretic particle 62. On the other hand, as shown in FIG. 6(*c*), when the voltage source 65*b* is connected, a negative drive voltage is applied to the electrode 51, the electrophoretic particles 62 positively charged migrate to the electrode 51 side far from the observer. In this state, the observer sees the color (deep color) of the liquid phase dispersion medium 61.

Here, the state in which the positive drive voltage is applied to the electrode 51 corresponds to the state in which, referring to FIG. 4, a data signal having a positive drive voltage is supplied to the data line 45, and a scanning signal is sent to the scanning line 44 to turn on the transistor 48, and the state in which the negative drive voltage is applied to the electrode 51 corresponds to the state in which a data signal having a negative drive voltage is supplied to the data line 45, and a scanning signal is sent to the scanning line 44 to turn on the transistor 48.

In this manner, by causing the electric polarization in the electrophoretic dispersion liquid 46 in the microcapsule 53*a*, two kinds of colors corresponding to the positive and negative polarity of the drive voltage applied can be displayed, and a desired image can be displayed by arranging the structures described above over the entire area of the display area 41.

Here, when a drive voltage is applied to the capacitor element 47, that is, the electrophoretic dispersion liquid 46, to accumulate an electric charge in a predetermined amount, the electrophoretic dispersion liquid 46 enters the state of electric polarization by the accumulated charge, and maintains the display content for a predetermined period. However, the displayed content disappears as the state of electric polarization gradually diminishes due to electrical discharge or the like due to the passage of time. A display retaining period from the time when the drive voltage is applied to the time when the display disappears depends on the amount of electric charge that accumulates by the application of the drive voltage, and the amount of electric charge that accumulates depends on the electrostatic capacity of the capacitor element 47. However, the longer the time the drive voltage is applied, the greater the amount of electric charge that accumulates increases up to the electrostatic capacity of the capacitor element 47. In other words, the display retaining period of the electrophoretic display device 34 can be controlled by controlling the time duration to apply the drive voltage.

Figure 7:
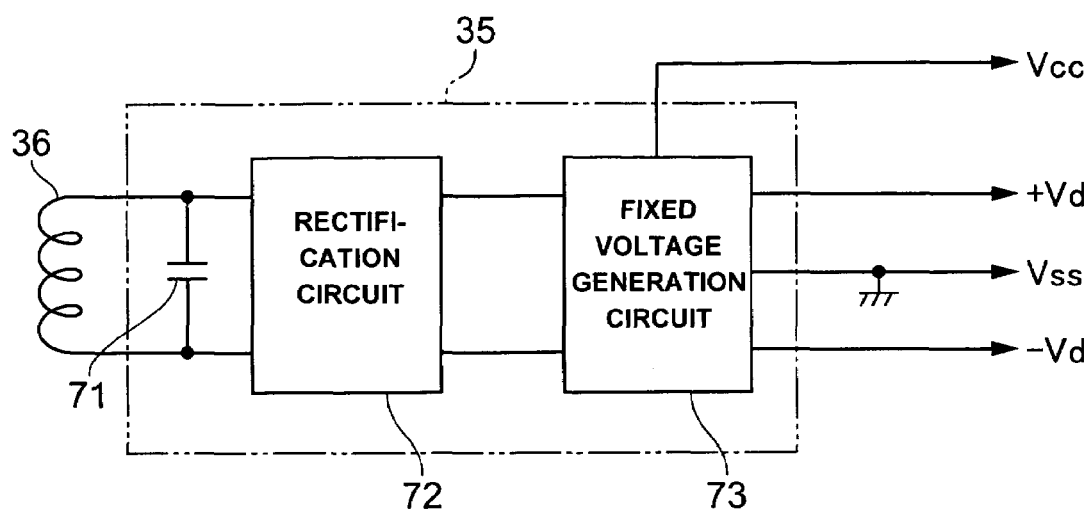
FIG. 7 is a block diagram showing a circuit structure of an electric supply generation section in accordance with the first embodiment.

Next, the power supply generation section 35 as an electric power generation section of the identification tag 3 is described with reference to FIG. 7. FIG. 7 is a block diagram of a circuit structure of the power supply generation section 35.

As shown in FIG. 7, the power supply generation section 35 has a resonance capacitor 71 connected in parallel with a coil antenna 36, and resonates and receives a carrier wave transmitted from the reader/writer device 2 with the coil antenna 36 and the resonance capacitor 71. The received carrier wave is rectified with a rectification circuit 72, and sent to a fixed voltage generation circuit 73. The fixed voltage generation circuit 73 generates a ground potential VSS and an operation voltage VCC necessary for operating each of the circuits of the identification tag 3, and generates two drive voltages +Vd and −Vd for displaying an image on the electrophoretic display device. The drive voltage +Vd is a positive voltage, and is supplied to the data line 45 as a data signal when the pixel 40 of the electrophoretic display device 34 is made to be a light color, and the drive voltage −Vd is a negative voltage, and is supplied to the data line 45 as a data signal when the pixel 40 is made to be a deep color.

Since the identification tag 3 is composed in a manner described above, first of all, in all of the pixels 40, a negative drive voltage −Vd is impressed to the electrophoretic dispersion liquid 46 for a sufficient time, such that the electrophoretic particles 62 completely migrate to the electrode 51 side (reset operation). Next, by applying a drive voltage of +Vd or −Vd to each of the pixels 40 for a predetermined period of time according to display data, an electric charge in the amount corresponding to the application time is accumulated in the capacitor element 47. As a result, the electrophoretic particles 62 migrate to the transparent electrode 54 side at the pixels 40 to which a positive drive voltage +Vd is applied, and an image corresponding to the display data is displayed. This image will disappear after the display retaining period corresponding to the amount of accumulated electric charge elapses.

Figure 8:
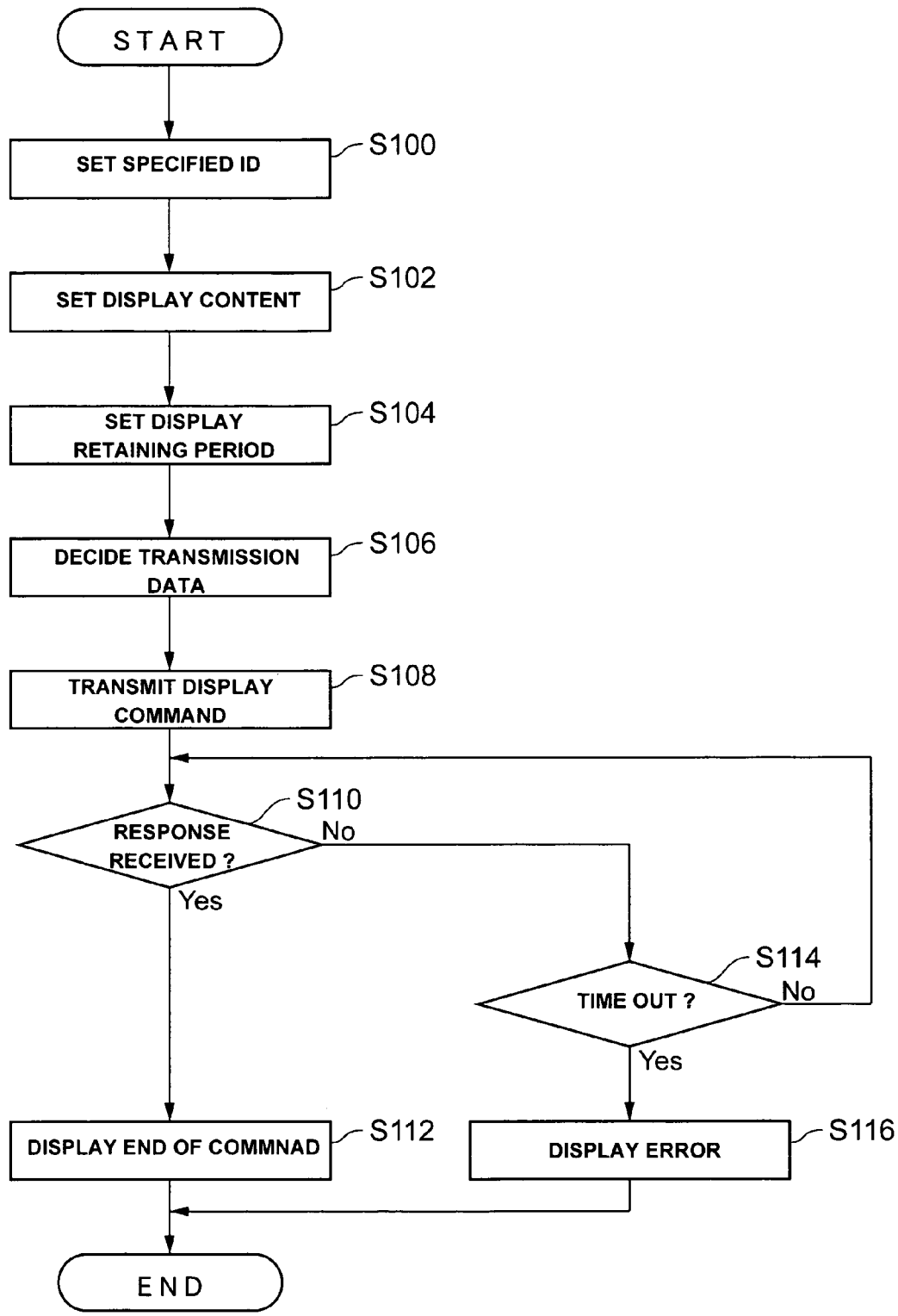
FIG. 8 is a flow chart of operation processings of the reader/writer device which take place when performing a display on the identification tag.

Next, referring to FIG. 8, a description is made as to a flow of operation processings of the reader/writer device 2, which take place when the display retaining period is matched with the best-before date of merchandise and displayed, with the electrophoretic display device 34 of the identification tag 3 structured as described above. FIG. 8 is a flow chart of operation processings of the reader/writer device 2, which take place when a display is made on the identification tag 3. It is noted that, for the sake of simplicity, the reset operation is assumed to have been completed.

First, by operating the operation section 23 of the reader/writer device 2, the process proceeds to step S100 shown in FIG. 8.

In step S100, an identification number of the identification tag 3 that is subject to setting of the best-before date is specified by the operation section 23, and the process proceeds to step S102.

In step S102, an image to be displayed on the electrophoretic display device 34 of the identification tag 3 is specified. Here, for example, a mark "○" as the content to be displayed is specified, and the process proceeds to step S104.

In step S104, a display retaining period of the electrophoretic display device 34 is specified. In the present embodiment, the display retaining period is matched with the best-before date of merchandise and set. Therefore, for example, when the best-before date is three days later, a period of three days is specified by the operation section 23, and the process proceeds to step S106.

In step S106, display data corresponding to the display content specified in step S102 is decided, and a drive voltage application time is decided from the display retaining period specified in step S104. As a result, transmission data that is composed of the ID number, the display data, and the drive voltage application time as display retaining period information is decided, and the process proceeds to step S108. Here, if the drive voltage application time is decided from the display retaining period, a relational expression derived from experiments, etc. may be stored in the ROM 25 of the reader/writer device 2, and the drive voltage application time may be calculated from the specified display retaining period with the control section 22. Alternatively, the reader/writer device 2 may be equipped with an LUT (Look Up Table) that correlates display retaining periods and drive voltage application times based on experimental data, and a decision may be made based on this.

In step S108, the transmission data with a display command is transmitted to the identification tag 3, and the process proceeds to step S110.

In step S110, a determination is made as to whether a response indicating that the display has been normally completed is received from the identification tag 3 having the above-described identification number. The process proceeds to step S112 if the response is received, and proceeds to step S114 when the response is not received.

When the process proceeds to step S112, an event indicating that the display has been normally made on the identification tag 3 is displayed on the display section 26, and the process ends.

In step S114, when it is determined in step S110 that a response is not received, a determination is made as to whether a predetermined time has passed since the display command was transmitted. The process returns to step S110 if the predetermined time has not passed, and proceeds to step S116 if the predetermined time has passed, an error display is made on the display section 26, and the process ends.

Figure 9:
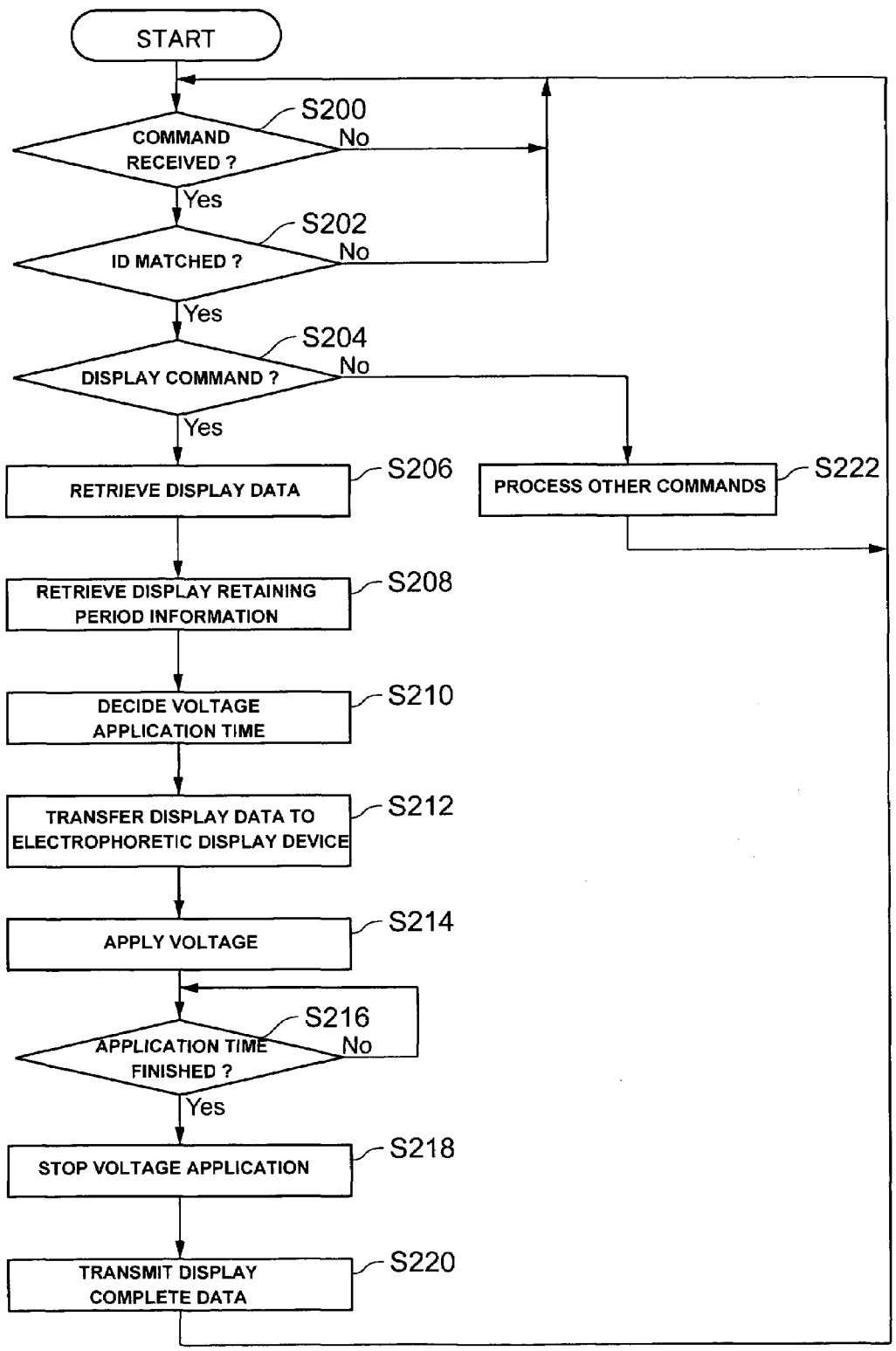
FIG. 9 is a flow chart of operation processings of the identification tag which take place when performing a display.

Next, referring to FIG. 9, a description is made as to a flow of operation processings of the identification tag 3, which take place when a display is made on the electrophoretic display device 34 based on the data received from the reader/writer device 2. FIG. 9 is a flow chart showing operation processings of the identification tag 3 when performing a display.

First, when the electromagnetic wave is received from the reader/writer device 2, the identification tag 3 generates with the power supply generation section 35 an operation voltage VCC necessary for operating each of its sections, to become an operative state, and the process proceeds to step S200.

In step S200, the control section 32 judges as to whether the carrier wave is a command from the reader/writer device 2. The process proceeds to step S202 when it is a command, and repeats step S200 if not.

In step S202, it is judged whether the ID number transmitted with the command matches with its own ID number. The process proceeds to step S204 when they match, and returns to step S200 when they do not match.

In step S204, a determination is made as to whether the received command is a display command. The process proceeds to step S206 when it is a display command, and the process proceeds to step S222 when it is a command other than the display command, where a processing for that other command is performed, and then returns to step S200.

In step S206, the display data is extracted from among the data received with the display command, and is stored in the data storage section 33, and the process proceeds to step S208.

In step S208, the display retaining period information is retrieved from among the data received with the display command, and stored in the data storage section 33, and the process proceeds to step S210.

In step S210, a drive voltage application time for applying the drive voltage to the electrophoretic display device 34 is calculated from the display retaining period information retrieved, and stored in the data storage section 33, and the process proceeds to step S212. It is noted that, in the present embodiment, since the drive voltage application time has already been decided by the reader/writer device 2, and the drive voltage application time itself is received as the display retaining period information, the aforementioned step is omitted.

In step S212, the display data retrieved is forwarded to the electrophoretic display device 34, and the process proceeds to step S214.

In step S214, the data line drive circuit 43 of the electrophoretic display device 34 outputs data signals corresponding to the display data to the data lines 45. More specifically, a positive drive voltage +Vd is outputted to the data lines 45 connected with those of the pixels 40 that are to be displayed in a light color, and a negative drive voltage −Vd is outputted to the data lines 45 connected with those of the pixels 40 that are to be displayed in a deep color. Further, by the control of the control section 32, the scanning line drive circuit 42 sends scanning signals to the scanning lines 44 to turn on the transistors 48, whereby the drive voltage is applied to the capacitor element 47 of each of the pixels 40 to accumulate an electric charge. Then the process proceeds to step S216.

In step S216, the control section 32 judges an elapsed time after the transistors 48 were turned on. If the elapsed time has not reached the drive voltage application time stored in the data storage section 33, step S216 is repeated, and the process proceeds to step S218 when it has reached the drive voltage application time.

In step S218, by the control of the control section 32, the scanning line drive circuit 42 turns off the transistors 48 to stop application of the drive voltage, and the process proceeds to step S220. Although omitted in FIG. 8, a series of steps S214–S218 is conducted for each of the scanning lines 44. When the processings described above are performed for all of the scanning lines 44, the desired display ("○" mark) appears over the entire surface of the display area 41. Also, the drive voltage application time from the start of application of the drive voltage in step S214 to the stop thereof in step S218 is controlled by the control section 32 based on the display retaining period information included in the data received from the reader/writer device 2. Accordingly, in the present embodiment, the control section 32 functions as an application time variable section.

In step S220, an event indicating that the display on the electrophoretic display 34 is normally completed is transmitted with its own identification number to the reader/writer device 2, and the process is completed.

The mark "○" displayed on the electrophoretic display device 34 of the identification tag 3 by the processings described above will disappear after the designated display retaining period elapses, such that the user can recognize that the best-before date has passed by the disappearance of the mark "○."

As described above, the following effects can be achieved according to the data communication system and the identification tag of the present embodiment.

(1) In accordance with the present embodiment, the identification tag 3 has the electrophoretic display device 34 that is capable of retaining a display content for a predetermined period of time even in a state in which a drive voltage is not applied, and the display retaining period can be changed by controlling the time duration to apply the drive voltage to the electrophoretic display device 34 to thereby control the amount of accumulated charge in the capacitance element 47. As a result, a display content at the electrophoretic display device 34 can be retained for a specified period of time. It is noted here that, because the display condition at the electrophoretic display device 34 changes, for example, the display disappears, after the above-described display retaining period has elapsed, the passage of time elapsed from the time the drive voltage was applied can be learned by the display state of the electrophoretic display device 34. Therefore, by setting display retaining periods to match with best-before dates of commercial products, these best-before dates can be visually and instantaneously recognized.

(2) In accordance with the present embodiment, the identification tag 3 has the control section 32, and the control section 32 functions as an application time variable section that changes the time duration of application of the drive voltage to the electrophoretic display device 34 according to the display retaining period information received from the reader/writer device 2. As a result, the reader/writer device 2 can change the time duration of application of the drive voltage to the electrophoretic display device 34, by only transmitting data corresponding to a desired display retaining period.

(3) In accordance with the present embodiment, because the display retaining period of the electrophoretic display device 34 is changed by controlling the time duration of application of the drive voltage to the electrophoretic display device 34, the drive voltage to be applied does not need to be controlled according to the display retaining period. In other words, the power supply generation section 35 does not need to generate voltages at many different levels.

(4) In accordance with the present embodiment, because data communications are possible in a contactless manner between the reader/writer device 2 and the identification tags 3, the identification tags 3 do not have to be connected to the reader/writer device 2 at the time of data communications, and therefore display retaining periods of numerous identification tags 3 can be readily set.

(5) In accordance with the present embodiment, the identification tag 3 is equipped with the power supply generation section 35 that generates electric power from electromagnetic waves transmitted from the reader/writer device 2, such that the-identification tag 3 does not have to be equipped with a power supply such as a battery, and thus the identification tag 3 can be made smaller and thinner.

Second Embodiment

Figure 10:
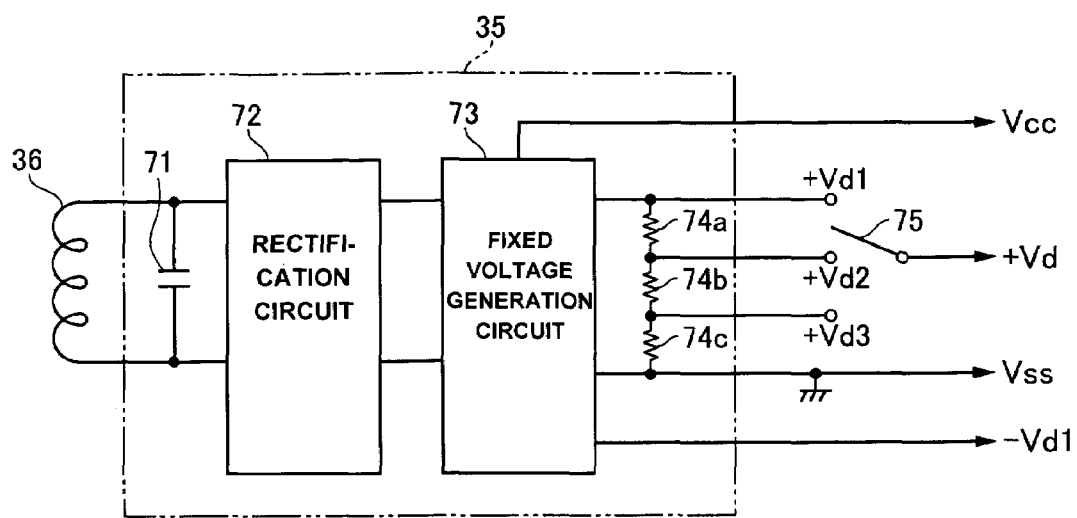
FIG. 10 is a block diagram showing a circuit structure of an electric supply generation section in accordance with a second embodiment.

A second embodiment of the present invention is described with reference to FIG. 10. It is noted that the same components as those of the first embodiment are identified with the same reference numbers, and their description is omitted. FIG. 10 is a block diagram of a circuit structure of a power supply generation section 35 of the second embodiment.

As shown in FIG. 10, similarly to the first embodiment, a constant voltage generation circuit 73 of the power supply generation section 35 generates a grounding potential VSS, an operation voltage VCC, and two drive voltages +Vd1 and −Vd1 for driving an electrophoretic display device 34. The power supply generation section 35 further generates two positive drive voltages +Vd2 and +Vd3 by a resistive division with three resistances 74a, 74b and 74c that are provided between the positive drive voltage +Vd1 and the grounding potential VSS generated by the constant voltage generation circuit 73. Here, the potentials have a relation of −Vd1<VSS<Vd3<Vd2<Vd1. One of the three positive drive voltages, +Vd1, +Vd2 and +Vd3, that are generated by the power supply generation section 35, is selected by a switching circuit 75 as an application voltage variable section of the power supply generation section 35, and supplied with the negative drive voltage −Vd1 to the electrophoretic display device 34 as a positive drive voltage +Vd.

As described above, a display retaining period from the time when the drive voltage is applied to the capacitor element 47 to the time when a display disappears depends on the amount of electric charge that accumulates by the application of the drive voltage, and the amount of electric charge that accumulates depends on the electrostatic capacity of the capacitor element 47. However, the greater the potential difference to be applied, the greater the amount of electric charge that accumulates increases up to the electrostatic capacity of the capacitor element 47 when the drive voltage application period is constant. In other words, the display retaining period of the electrophoretic display device 34 can be controlled by controlling the drive voltage.

The flow of operation processings of the reader/writer device 2 which take place when a display is made on the identification tag 3 by the data communication system 1 of the present embodiment is similar to that of the first embodiment, as shown in FIG. 8. However, in step S104, when specifying the display retaining period information, one drive voltage that corresponds to a desired display retaining period is selected from among the three positive drive voltages +Vd1, +Vd2, and +Vd3.

Figure 11:
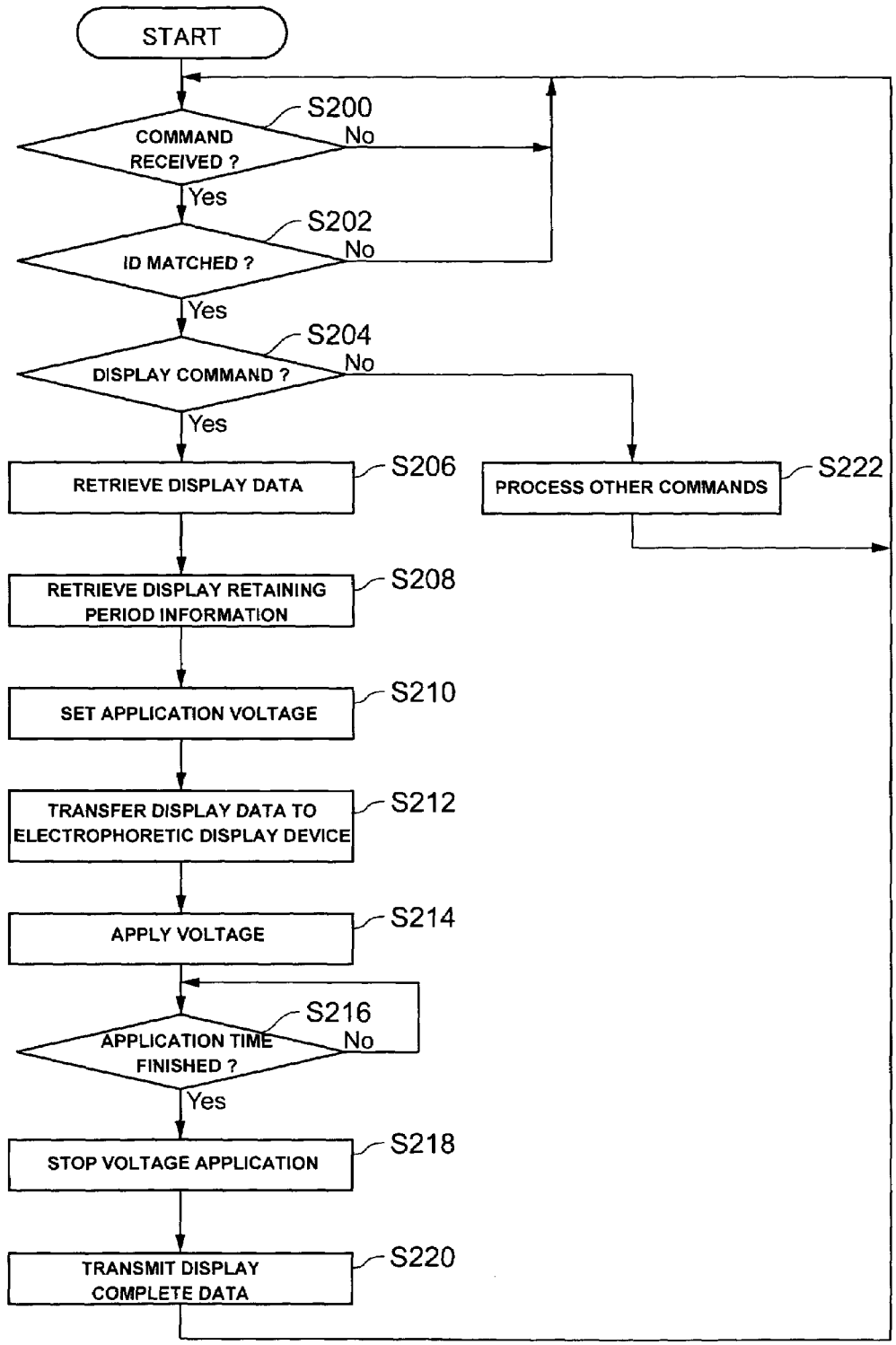
FIG. 11 is a flow chart of operation processings of an identification tag which take place when performing a display by a data communication system in accordance with the second embodiment.

Next, referring to FIG. 11, a description is made as to a flow of operation processings of the identification tag 3, which take place when a display is made on the electrophoretic display device 34. FIG. 11 is a flow chart showing the operation processings of the identification tag 3 when performing a display by the data communication system in accordance with the second embodiment.

In the first embodiment, a drive voltage application time is decided in step S210. However, in accordance with the present embodiment, whether a drive voltage to be applied is +Vd1, +Vd2, or +Vd3 is obtained from the received display retaining period information, and the switching circuit (see FIG. 10) of the control section 32 is set accordingly.

In step S216, an elapsed time after the transistors 48 were turned on is judged. However, in accordance with the present embodiment, the drive voltage application period is always constant regardless of the display retaining period, and the aforementioned elapsed time is compared to a predetermined time.

As described above, the following effects, in addition to the effects in the first embodiment described above, can be obtained according to the data communication system and the identification tag in accordance with the present embodiment.

(1) In accordance with the present embodiment, because the identification tag 3 has the application voltage variable section, the reader/writer device 3 can change the drive voltage to be applied to the electrophoretic display device 34, only by transmitting data corresponding to a desired display retaining period. As a result, the reader/writer device 2 does not need to change the drive voltage to be supplied to the identification tag 3 according to a display retaining period to be set.

(2) In accordance with the present embodiment, the display retaining period is set by controlling the drive voltage to be applied to the electrophoretic display device 34, such that, even when different display retaining periods are set for a plurality of identification tags 3, the drive voltage application period does not need to be controlled.

Third Embodiment

Figure 12:
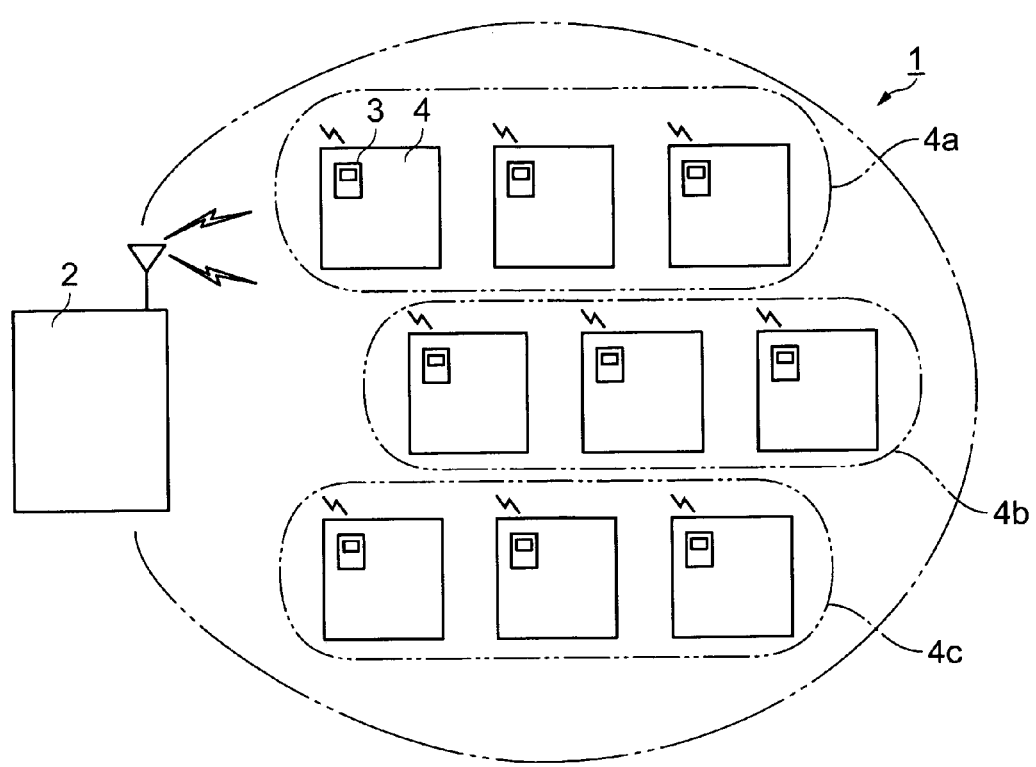
FIG. 12 is a schematic structural diagram showing a structure of a data communication system in accordance with a third embodiment.
Figure 13:
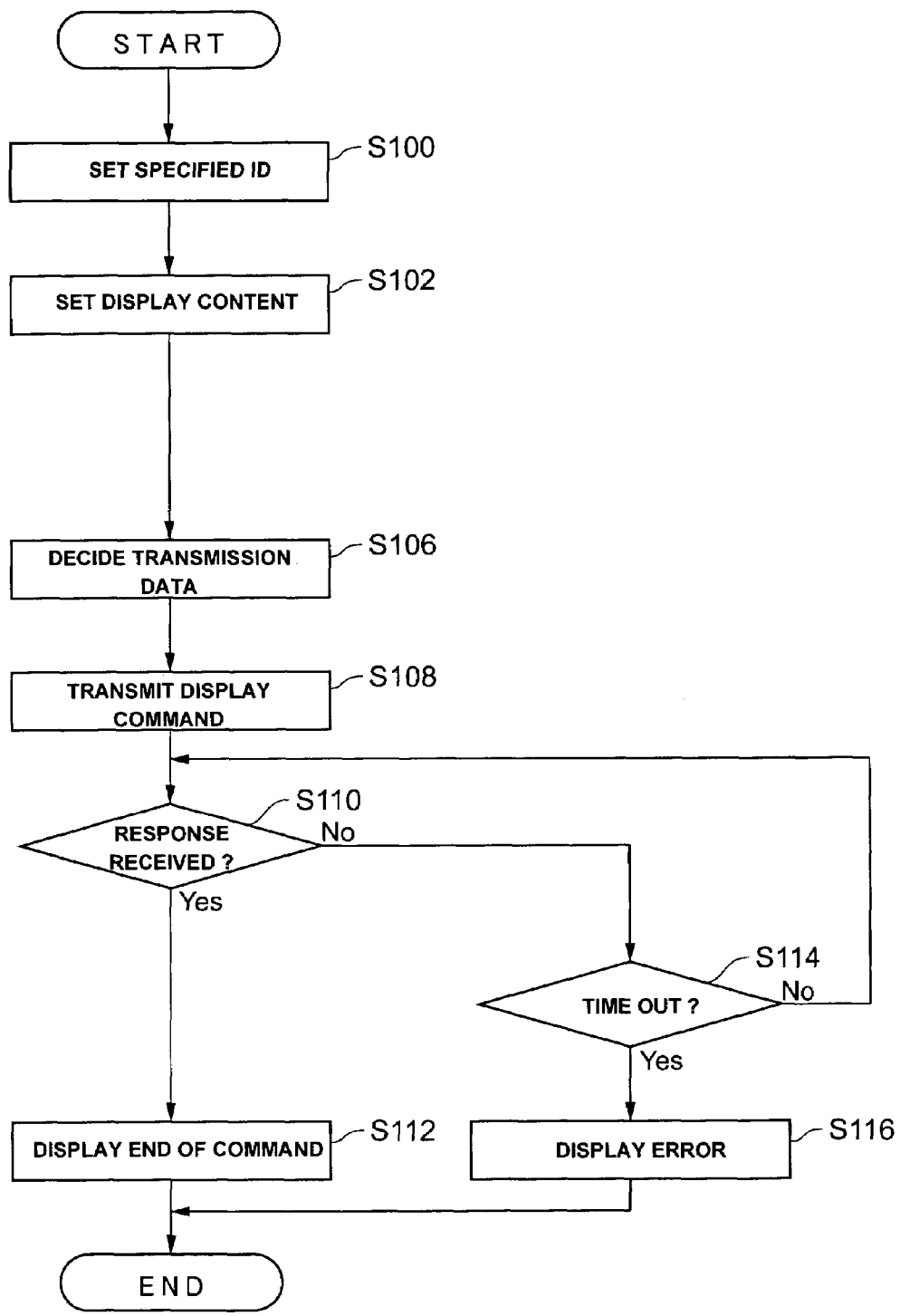
FIG. 13 is a flow chart of operation processings of a reader/writer device which take place when performing a display on an identification tag by the data communication system in accordance with the third embodiment.
Figure 14:
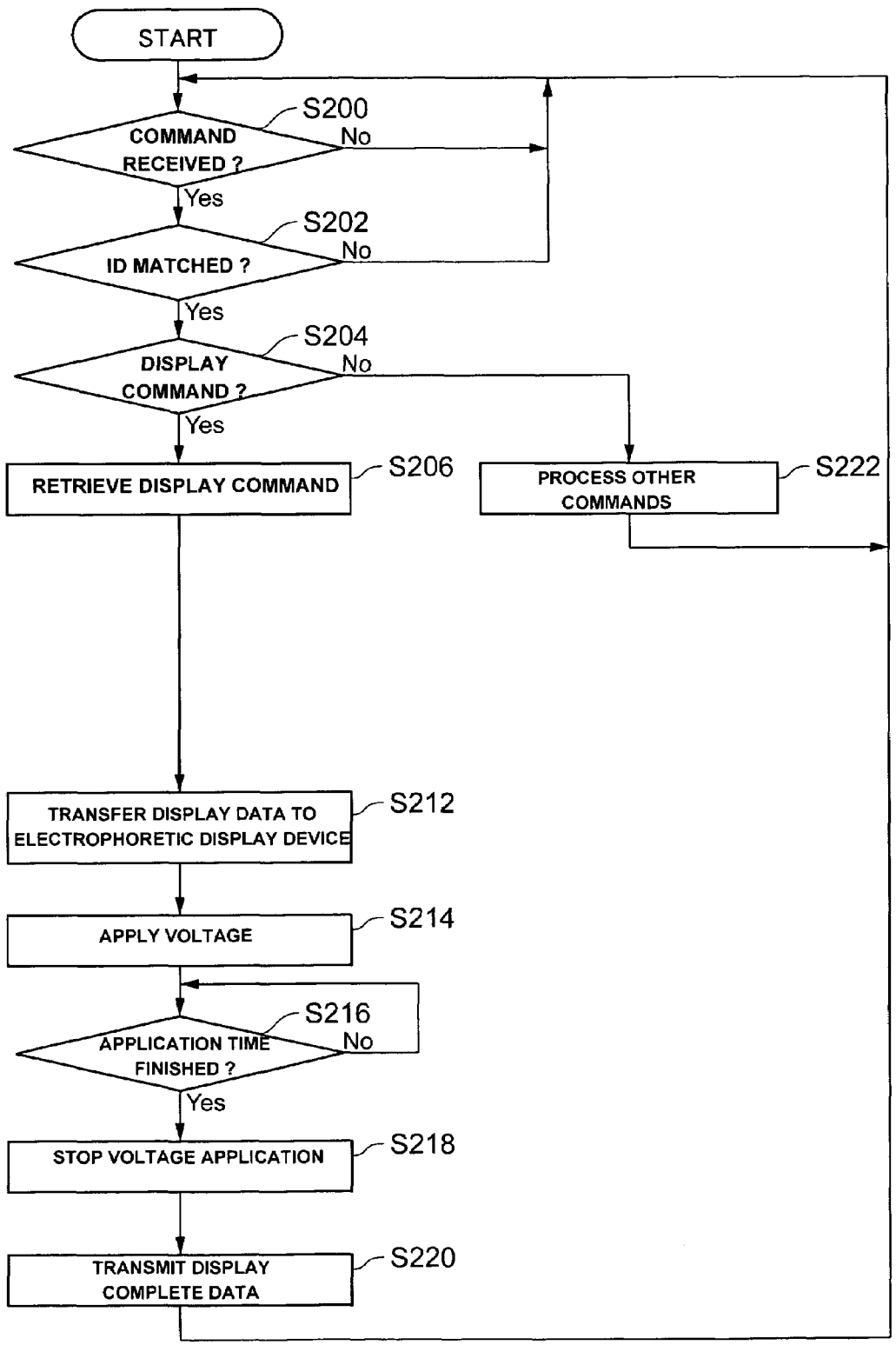
FIG. 14 is a flow chart of operation processings of an identification tag which take place when performing a display by the data communication system in accordance with the third embodiment.

A third embodiment of the present invention is described with reference to FIG. 12–FIG. 14. It is noted that the same components as those of the first embodiment or the second embodiment are identified with the same reference numbers, and their description is omitted. FIG. 12 is a schematic structural diagram of the structure of a data communication system in accordance with the third embodiment, FIG. 13 is a flow chart of operation processings of a reader/writer device 2 which take place when a display is performed on an identification tag 3 by the data communication system in accordance with the third embodiment, and FIG. 14 is a flow chart of operation processings of the identification tag 3 which take place when a display is performed by the data communication system in accordance with the third embodiment.

As shown in FIG. 12, in the data communication system 1 of the present embodiment, commercial products 4 are divided into three commercial product groups 4a, 4b and 4c, and an electrophoretic display device 34 of the identification tag 3 that is attached to each of the commercial products 4 has pixels 40 with capacitor elements 47 each having an electrostatic capacity different in each of the commercial product groups.

As described above, a display retaining period from the time when a drive voltage is applied to the capacitor element 47 to the time when a display disappears depends on the amount of electric charge that accumulates by the application of the drive voltage, and the amount of electric charge that accumulates depends on the electrostatic capacity of the capacitor element 47. Here, in accordance with the present embodiment, because the electrostatic capacity of the capacitor elements 47 is different in each of the commercial product groups, the display retaining period of the electrophoretic display device 34 differs in each of the commercial product groups even when the drive voltage is applied under the same condition (voltage and time). In other words, in accordance with the present embodiment, as indicated in FIG. 12 and FIG. 13, three different display retaining periods can be set without setting display retaining period information by the reader/writer device 2 (step S104) or retrieving display retaining period information by the identification tag 3 (step S208, S210).

As described above, the following effects, in addition to the effects in the first embodiment and the second embodiment described above, can be obtained according to the data communication system and the identification tag in accordance with the present embodiment.

(1) In accordance with the present embodiment, because the identification tags 3 with three different display retaining periods are included, three kinds of best-before dates can be set even when the same drive voltage is applied for the same period of time to the electrophoretic display devices 34 of all of the identification tags 3.

Variation Examples

It is noted that the embodiments of the present invention can be modified as follows.

In the embodiments described above, the reader/writer device 2 and the identification tag 3 perform data communications in a contactless manner. However, data communications may be made in a contact manner.

According to the above, since data communications do not need to be performed in a contactless manner, the first data communication section 2a and the second data communication section 3a can be simplified, and miniaturization and price cutting of both of the reader/writer device 2 and the identification tag 3 can be achieved. In particular, the second data communication section of the identification tag 3 only has to be provided with a connector or a terminal to make a connection to the reader/writer device 2.

In the embodiments described above, although the identification tag 3 has the application time variable section or the application voltage variable section, the reader/writer device 2 may be provided with these sections.

Consequently, because the application time variable section or the application voltage variable section for changing the display retaining period of the electrophoretic display device 34 is provided on the side of the reader/writer device 2, the circuit structure of the identification tag 3 can be simplified, and miniaturization and price cutting of the identification tag 3 can be achieved. In addition, in this case, if the reader/writer device 2 and the identification tag 3 perform data communications in a contact manner, the identification tag 3 can be composed only with the electrophoretic display device 34 that is equipped with a terminal as the second data communication section.

In the third embodiment described above, the display retaining period is made different by changing the electrostatic capacity of the capacitor element 47. However, without being limited to the above, different display retaining periods may be provided by using different constituting materials in the liquid phase dispersion medium 61 and the electrophoretic particles 62, or different display retaining periods may be provided by changing the composition of these materials.

Next, technical ideas that can be understood from the above-described embodiments and the variation examples are added as follows with effects thereof.

(1) A method for setting a display retaining period in a data communication system including a reader/writer device and an identification tag that is capable of data communications with the reader/writer device, wherein:

the reader/writer device has a first data communication section that is capable of data communications with the identification tag, and the identification tag has a second data communication section that is capable of data communications with the reader/writer device, a display section that is capable of displaying based on data received by the second data communication section, and is capable of retaining a display for a predetermined period of time in a state in which a drive voltage is not applied, and a control section that controls the second data communication section and the display section, the method for setting a display retaining period characterized in including:

a step of transmitting by the reader/writer device to the identification tag data corresponding to a specified display retaining period, and a step of applying a drive voltage for a period of time corresponding to the data by the identification tag to the display section.

According to the above, because the identification tag controls the drive voltage application time, the reader/writer device may only have to transmit data corresponding to a desired display retaining period, and the identification tag can control the time duration for applying the drive voltage to the display section, and set a desired display retaining period. In other words, the reader/writer device does not need to control the time duration for applying the drive voltage to the display section.

(2) A method for setting a display retaining period in a data communication system including a reader/writer device and an identification tag that is capable of data communications with the reader/writer device, wherein:

the reader/writer device has a first data communication section that is capable of data communications with the identification tag, and the identification tag has a second data communication section that is capable of data communications with the reader/writer device, a display section that is capable of displaying based on data received by the second data communication section, and is capable of retaining a display for a predetermined period of time in a state in which a drive voltage is not applied, and a control section that controls the second data communication section and the display section, the method for setting a display retaining period characterized in including:

a step of transmitting by the reader/writer device to the identification tag data corresponding to a specified display retaining period, and a step of applying a drive voltage corresponding to the data by the identification tag to the display section.

According to the above, because the identification tag controls the drive voltage to be applied to the display section, the reader/writer device may only have to transmit data corresponding to a desired display retaining period, and the identification tag can change the drive voltage to be applied to the display section, and set a desired display retaining period. In other words, the reader/writer device does not need to change the drive voltage to be applied to the display section according to a display retaining period that is set.

Furthermore, because the display retaining period is set by controlling the drive voltage to be applied to the display section, even when different display retaining periods are set for a plurality of identification tags, the drive voltage application time does not need to be controlled according to the display retaining periods.

It is noted that, in the present specification, expiration dates of commodities means elapsed time from prescribed date, such as, expiration dates of commuter passes, admission tickets and the like, return time limits of rental articles, and the like, besides best-before dates of food products.

What is claimed is:

1. A data communication system comprising:
a reader/writer device; and
an identification tag that communicates data with the reader/writer device, wherein:
the reader/writer device has a first data communication section that communicates data with the identification tag;
the identification tag has a second data communication section that communicates data with the reader/writer device, and a display section that displays based on data received by the second data communication section, and that retains a display content for a display retaining period after a drive voltage is applied to the display section for a drive voltage application time and while no drive voltage is applied to the display section;
the identification tag is attached to at least one of a commodity and a commodity package;
at least one of the drive voltage and the drive voltage application time are calculated based on a desired display retaining period that corresponds to a time limit of the commodity; and
the display retaining period is controlled by the applied drive voltage and the drive voltage application time and corresponds to the desired display retaining period.

2. A data communication system according to claim 1, wherein the identification tag has a control section that controls the second data communication section and the display section.

3. A data communication system according to claim 2, wherein the control section of the identification tag has an application time variable section that controls the drive voltage application time.

4. A data communication system according to claim 2, wherein the control section of the identification tag has an application voltage variable section that controls the applied drive voltage.

5. A data communication system according to claim 2, wherein
the first data communication section and the second data communication section are capable of contactless data communications;
the reader/writer device has an electromagnetic wave transmission section for electric power supply that transmits electromagnetic waves for electric power supply to the identification tags at the time of data communications by the first data communication section; and
the identification tag has an electric power generation section that generates electric power from the electromagnetic waves for electric power supply transmitted from the reader/writer device.

6. A data communication system according to claim 1, wherein the reader/writer device has an application time variable section that controls the drive voltage application time.

7. A data communication system according to claim 1, wherein the reader/writer device has an application voltage variable section that controls the applied drive voltage.

8. A data communication system comprising:
a reader/writer device; and
a plurality of identification tags that communicate data with the reader/writer device, wherein:
the reader/writer device has a first data communication section that communicates data with the identification tags;
each of the identification tags has a second data communication section that communicates data with the reader/writer device, and a display section that performs a display based on data received by the second data communication section, and the display section retains a first display content for a first display retaining period after a drive voltage is applied to the display section for a first drive voltage application time and while no drive voltage is applied to the display section and a second display content for a second display retaining period after the applied drive voltage is applied to the display section for a second drive voltage application time and while no drive voltage is applied to the display section;
the identification tag is attached to at least one of a commodity and a commodity package;
the first drive voltage application time is calculated based on a first desired display retaining period that corresponds to a first time limit of the commodity;
the second drive voltage application time is calculated based on a second desired display retaining period that corresponds to a second time limit of the commodity; and
the first and second display retaining periods are controlled by the applied drive voltage and the first and second drive voltage application times.

9. An identification tag comprising:
a data communication section that communicates data with a reader/writer device;
a display section that displays based on data received by the data communication section, and that retains a display content for a display retaining period after a drive voltage is applied to the display section for a drive voltage application time and while no drive voltage is applied to the display section; and
a control section that controls the data communication section and the display section;
wherein the control section controls the applied drive voltage and the drive voltage application time to control the display retaining period of the display section;
wherein at least one of the drive voltage and the drive voltage application time are calculated based on a desired display retaining period;
and wherein the identification tag is attached to at least one of a commodity and a commodity package and the desired display retaining period corresponds to a time limit of the commodity.

10. An identification tag according to claim 9, wherein the control section has an application time variable section that controls the drive voltage application time.

11. An identification tag according to claim 9, wherein the control section has an application voltage variable section that controls the applied drive voltage.

12. An identification tag according to claim 9, wherein the data communication section is capable of contactless data communications with the reader/writer device, and has an electric power generation section that generates electric power from electromagnetic waves for electric power supply received from the reader/writer device.

13. A method for notifying an elapsed time period, comprising:
- calculating at least one of a drive voltage and a drive voltage application time based on a desired display retaining period;
- applying the drive voltage for the drive voltage application time to a display device that retains a display for a display retaining period after the applying and while no drive voltage is applied to the display device;
- notifying an elapsed time period based on a change in a display state of the display device;
- wherein the display retaining period is controlled by the applied drive voltage and the drive voltage application time and corresponds to the desired display retaining period.

14. A method for notifying an elapsed time period, comprising:
- attaching an identification tag to an item, the identification tag having a display section that retains a display for a display retaining period after a drive voltage is applied to the display device for a drive voltage application time and while no drive voltage is applied to the display device,
- calculating at least one of the drive voltage and the drive voltage application time based on a desired display retaining period,
- notifying an expiration time of the item according to a change in a display state of the display section,
- wherein the display retaining period is controlled by the applied drive voltage and the drive voltage application time to correspond to the desired display retaining period.

* * * * *